US011315125B2

(12) United States Patent
Consalvo et al.

(10) Patent No.: US 11,315,125 B2
(45) Date of Patent: Apr. 26, 2022

(54) PRIORITIZED DATA SYNCHRONIZATION

(71) Applicant: T-Mobile USA, Inc., Bellevue, WA (US)

(72) Inventors: John Consalvo, Issaquah, WA (US); Michael Carley, Sammamish, WA (US); Charles Lamb, Issaquah, WA (US); Callie Field, Bellevue, WA (US); Siddharth Bothra, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 201 days.

(21) Appl. No.: 16/516,194

(22) Filed: Jul. 18, 2019

(65) Prior Publication Data

US 2020/0027094 A1   Jan. 23, 2020

Related U.S. Application Data

(60) Provisional application No. 62/700,160, filed on Jul. 18, 2018.

(51) Int. Cl.
| | | |
|---|---|---|
| *G06Q 30/06* | (2012.01) | |
| *G06Q 30/00* | (2012.01) | |
| *H04L 67/1095* | (2022.01) | |
| *G06F 16/35* | (2019.01) | |
| *G06Q 10/06* | (2012.01) | |
| *H04L 41/0803* | (2022.01) | |

(52) U.S. Cl.
CPC ......... *G06Q 30/016* (2013.01); *G06F 16/353* (2019.01); *G06Q 10/06316* (2013.01); *H04L 41/0803* (2013.01); *H04L 67/1095* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,438,212 | B1* | 10/2019 | Jilani | G06Q 30/0281 |
| 2003/0165223 | A1* | 9/2003 | Timmins | G06Q 20/32 |
| | | | | 379/207.02 |
| 2004/0120250 | A1* | 6/2004 | Langevin | H04L 41/0681 |
| | | | | 370/216 |
| 2008/0172574 | A1* | 7/2008 | Fisher | G06Q 10/10 |
| | | | | 714/25 |
| 2017/0249610 | A1* | 8/2017 | Ferrer | G06F 21/105 |

* cited by examiner

*Primary Examiner* — Arif Ullah
(74) *Attorney, Agent, or Firm* — Han Santos, PLLC

(57) ABSTRACT

In a system including geographically distinct data centers that support a customer service team with customer service groups variously aligned to the data centers and collectively providing continuous customer service to a specified set of customers via multiple temporal duty shift, unsolved problems to be transferred to a customer service group having a next temporal duty shift are prioritized. In accordance with the prioritization, information and data regarding unsolved problems is synchronized and transferred from a customer service data center supporting the currently working customer service group, to a customer service data center supporting a customer service group having the next temporal duty shift. The information regarding unsolved problems or otherwise higher priority problems is synchronized before information regarding solved or otherwise lower priority problems and is optionally synchronized via different communication channels than lower priority problem information.

20 Claims, 3 Drawing Sheets

PRIORITIZED DATA SYNCHRONIZATION

BACKGROUND

Wireless carrier networks strive to provide good customer care to customers. Good customer care may include several elements. For example, it should be easy for customers to connect with customer care representatives by calling, scheduling an appointment using an app, or messaging. Good customer care also means a positive, productive experience for customers—for example, reduction or elimination of call transfers within customer service, customer care representatives that have total ownership to both solve problems for customers and become familiar with regional or local characteristics and problems faced by a particular set of customers (e.g., a geographic region or area). These capabilities can be implemented with a team of experts who can fix problems quickly and thoroughly, handle repeat callers with minimum waste or time or repetition and build shared knowledge through daily shared communication with other team members. A team of experts can be aligned with the particular set of customers, and the team can be divided into groups that are geographically dispersed so that daytime work shifts of the team groups together encompass or provide continuous service availability, e.g., 24/7, to the set of customers to which they are aligned.

BRIEF DESCRIPTION OF THE DRAWINGS

The detailed description is described with reference to the accompanying figures. In the figures, the left-most digit(s) of a reference number identifies the figure in which the reference number first appears. The same reference numbers indicate similar or identical items.

DETAILED DESCRIPTION

Figure 1:
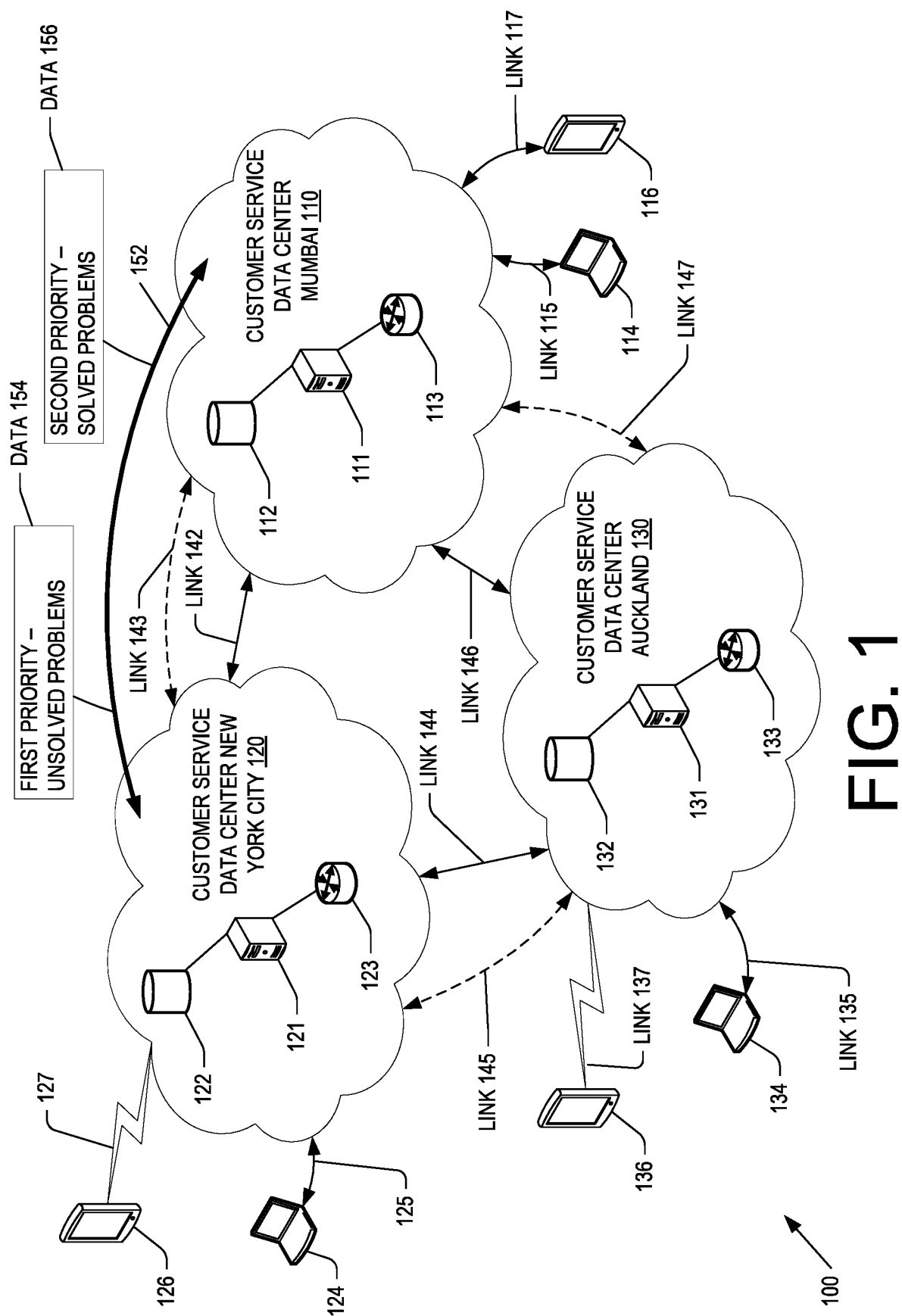
FIG. 1 shows an illustrative computing environment and network architecture for implementing techniques to synchronize prioritized data between different customer service data centers.

This disclosure is directed to systems and techniques for implementing synchronization of prioritized data between different customer centers. Wireless carrier networks strive to provide good customer care to customers, which can be implemented with a customer service team of experts who are aligned with a particular set of customers and who can fix problems quickly and thoroughly, handle repeat callers with minimum waste or time or repetition and build shared knowledge through daily shared communication with other team members. The customer service team can be divided into groups that are geographically dispersed so that daytime work shifts of the team groups together encompass or provide continuous service availability, e.g., 24/7, to the set of customers to which they are aligned.

In an example embodiment a customer service team of experts for a given customer set (for example a geographic area or region or other grouping of customers) is divided into several different groups that together provide continuous customer service coverage (e.g., 24 hours a day, 7 days a week, 365 days a year). For example, one group within the team takes a first 8-hour shift, a second group takes the next 8-hour shift, and a third group takes the last 8-hour shift. Shift lengths and numbers of groups in a team can vary, and can span any particular time period. For example, 6 groups can be provided to cover 48-hour cycles in 8 hour shifts, 2 groups to cover a 24-hour cycle in 12-hour shifts, and so forth.

Where the customer set has customers in a single geographic area and the team groups cover different times of day, the team groups can be located in or near the geographic zone and have the same day cycle as the customers and therefore have different shifts in the common time period (day, swing, and graveyard shifts for example). Alternatively or additionally, some or all of the groups in the customer service team for the customer set can be located in different time zones, and/or in different geographical parts of the world, so that their local time is different from the time experienced by customers in the customer set. Thus the group working time shifts can be well-suited for each group, for example, corresponding to a day shift in the area in which a group is located, works and lives, while still providing continuous service coverage for all times at a geographic zone of the customer set (or simply 24/7/365 service for the customer set assigned to the customer service team, regardless of the customer set's geographic distribution). For example, within the customer service team for the customer set, one team group's day shift corresponds to a swing shift in the geographic area of the customer set, another team group's day shift corresponds to a graveyard shift in the geographic area of the customer set, and so forth. In other words, the team groups' various day shifts collectively provide continuous coverage for the customer set, regardless of geographic span of the customer set (which can have local, regional, or worldwide geographic distribution).

In this situation where different groups within a customer service team are located in different geographical areas (even though they may serve a customer set in a particular geographical area or region, for example within a single time zone or metropolitan area, or a customer set distributed across a larger geographical area, for example multiple time zones or even a majority of time zones), the different groups can be advantageously served by different data centers respectively located in or near the geographical areas where the different groups of the customer service team are located. E.g., co-located data centers. The data center that a customer service group primarily works with can contain information regarding the wireless carrier network that the group needs to provide customer service, including but not limited to information about customers and their accounts/service agreements, equipment and so forth, as well as information about the network itself. Information about the network can include but is not limited to operational status, system functionality and capability, administrative information and processes, and so forth.

In an event where a problem rises to the attention of a first customer service group in a customer service team, information about the problem (customer, problem description, customer service involvement, problem status, and so forth) will be reflected into and out from the data center for that customer service group. The first customer service group can use the data center to enter, collect, update, revise, and analyze data pertaining to the problem to be solved. Some problems will be solved by that first customer service group during its temporal work shift, other problems may not be solved (or might be tentatively solved) and would need to be handed off to a next shift customer service group within the customer service team, or even to an overflow or reserve customer service team, to continue working on the problem and/or monitor and follow up to verify whether the problem is ongoing or recurring. In addition, different problems can be prioritized differently, for example assigned different importance or urgency for solving.

This gives rise to a technical problem of efficiently and effectively synchronizing data between data centers that support the different groups within the customer service team, so that information and responsibility can be properly shared and handed off within the customer service team from one group to the next (or in some cases, additionally or alternatively to another customer service team for overflow or synergy/common problem purposes). In accordance with various embodiments described herein, a technical solution is provided of prioritizing synchronization operations, to enable resolution of important and/or urgent problems more quickly and use data synchronization/transfer processes and mechanisms efficiently. In example embodiments variously described herein, information regarding problems that are already solved can be synchronized with low priority, whereas information regarding problems still requiring solution can be synchronized with higher priority for transfer to a next customer service group coming on shift. In situations where multiple problems to be solved have different priority relative to each other, information regarding those problems can be prioritized accordingly for synchronization/transfer to other customer service data centers.

FIG. 1 shows an illustrative computing environment 100 and network architecture for implementing techniques to prioritize synchronization. In particular, FIG. 1 shows three geographically distributed customer service data centers, each corresponding to a customer service group and collectively forming infrastructure to support a customer service team including the customer service groups. A first customer service data center 120 located in New York City includes a data store 122, a computational resource 121 and a router 123 and connects to user equipment of customer service group members such as a tablet computer 126 and a laptop computer 124 via communication links 127, 125 respectively. The user equipment enables the customer service group members to interact with, and direct functions of, the customer service data centers to provide customer services and solve problems. Also shown are a second customer service data center 110 located in Mumbai, India that includes a data store 112, a computational resource 111 and a router 113 and connects to user equipment of customer service group members such as a tablet computer 116 and a laptop computer 114 via communication links 117, 115 respectively; and a third customer service data center 130 located in Auckland, New Zealand that includes a data store 132, a computational resource 131 and a router 133 and connects to user equipment of customer service group members such as a tablet computer 136 and a laptop computer 134 via communication links 137, 135 respectively. The elements shown in FIG. 1 are representative, and can be adjusted in numbers consistent with different configurations and embodiments. Additional data centers, user equipment, data stores, computational resources and routers can be provided for the customer service data centers beyond those shown.

As shown in FIG. 1, the communication links between the user equipment of the customer service group members can be wireless links such as the wireless links 127, 137 or can be other links. Other communication links can include wired links, fiber optic links, or composite links that are formed by combinations of wired and wireless links and can span multiple communication networks and subnetworks including, for example, Internet networks, wireless telecommunication service provider networks, and public switched telephone networks.

Communication links are also provided between the customer service data centers. Links 144, 145 connect the New York City 120 and Auckland 130 customer service data centers, links 142, 143 connect the New York City 120 and Mumbai 110 customer service data centers, and links 146, 147 connect the Mumbai 110 and Auckland 130 customer service data centers. One link between two data centers is a link for higher-priority communications, and the other link is for lower-priority communications. In particular, the links 142, 144, 146 are links for higher-priority communications, and the links 143, 145, 147 are links for lower-priority communications. Although two links are shown between each pair of data centers, additional links can be provided, and links can use separate infrastructure or common infrastructure (for example, different communication channels in a common communication path or conduit).

Also shown in FIG. 1 is a communication path 152 between the Mumbai 110 and New York City 120 customer service data centers, that encompasses one or more of the communication links 142, 143. As shown in FIG. 1, the communication flow or path 152 carries a first data set 154 corresponding to unsolved problems for handoff from the customer service group in Mumbai to the customer service group in New York City that is coming on-shift, and also a second data set 156 corresponding to solved problems that is therefore lower priority. The data set 154 is transmitted or synchronized before the data set 156, and in example embodiments the data set 154 is synchronized via the higher-priority communication link 142 and the data set 156 is synchronized via the lower-priority communication link 143.

Higher-priority synchronization can require more resources or use of expensive resources to successfully accomplish. For example, higher-priority synchronization can use communication links such as the links 142, 144, 146 that provide faster transfer of data, transfer of data to more destinations, and use transmission pathways or techniques that provide higher security, reliability, and/or speed (and which therefore may be more expensive and/or less available). In addition, handing off problems that are important for a next customer service group within the team to continue solving or monitoring may require transfer of detailed information rather than minimal or summary information. In this situation one reason more resources would be required for a data synchronization between data centers serving respective groups in the customer service team is simply that more data is being transferred/synchronized. Lower priority data transfer or synchronization can, for example, use less expensive infrastructure and/or transfer methods, for example transferring data in batches, at off-peak times (e.g., temporal load balancing), through lower cost channels such as the communication links 143, 145, 147, and so forth.

An example process can include a first customer service group within a customer service team of experts becoming aware of/receiving a customer problem to solve, acting on the problem and in the course of receiving and acting on the problem, creating, retrieving, updating, and/or deleting records using the data center assigned or local to the customer service group, such as the New York City 120, Mumbai 110, and Auckland 130 customer service data centers.

At some point prior to a temporal work shift or responsibility change from the first group to a next or second group within the customer service team, determinations can be made regarding whether or not the problem has been solved or remains to be solved, requires monitoring, and regarding an importance or priority of the problem. This evaluation can include determining whether a problem is unlikely to be solved before an end of the current temporal work shift, a likelihood that the problem will recur in the next temporal work shift, and so forth, and can be performed by computational resources within the customer service data center, for example, by the computational resources 111, 121, 131 shown in FIG. 1. Similarly, the likelihood of solution within the current temporal work shift can be determined, for example, computational resources within the customer service data center such as the computational resources 111, 121, 131 shown in FIG. 1, based on one or more of the type of problem to be solved, an amount of time remaining in the current temporal work shift, a place of the problem in a queue of other problems to be solved first, an amount of resources available to address the problem, historic records of past solutions for the same problem or for similar problems, and so forth.

Determinations can also be made regarding the problem's status and next action steps to be taken or scheduled/considered. In the event that it becomes necessary or advisable to hand off a problem (e.g., a strong likelihood that the problem will not be solved in the current temporal work shift or will recur in the next temporal work shift), then next action steps and data pertaining to them can be prioritized, for example by a respective one of the computational resources 111, 121, 131 for synchronization with the customer service data center or data store of the customer service group having the next temporal work shift, before information regarding later action steps is synchronized or transferred. For example, the communication flow or path 152 in FIG. 1 includes the data sets 154 representing unsolved problems and/or problems likely to recur, that the Mumbai customer service group is handing off to the New York City customer service group coming on shift. Based on the problem and these determinations, further determinations or decisions can be made as to whether and when a handoff to the next customer service group will be scheduled and if yes, then with what priority and optionally in what detail.

For example, if a determination is made that the problem will not be, or is unlikely to be, solved in the current temporal work shift, then handoff information regarding the problem for use by the next customer service group can be prioritized for immediate transfer, or transfer can commence in response to the determination. In another situation, information regarding an unsolved problem can be scheduled to commence transfer when a remaining amount of time in the temporal work shift crosses a predetermined threshold. This can help ensure that there is sufficient time to synchronize useful data before the next shift starts, while still providing an opportunity to see if the problem can be solved during the current temporal work shift and thus avoid unnecessary synchronization of extra information (e.g., information to help solve a problem that is not needed if the problem has been solved) and/or unnecessary use of more expensive communication resources. If an unsolved problem is queued for handoff but is then solved before the time threshold is reached, it can be removed from the handoff queue. If a problem slated for handoff is solved while data regarding it is being handed off to a customer service data center for the next customer service group to come on shift, then transfer of data for that problem can cease and a notification that the problem has been solved can be synchronized and transferred.

The time threshold can be a fixed threshold (e.g., one hour remaining in the temporal work shift), or can be dynamically determined, for example by the computational resource(s) of the customer service data center that is preparing to synchronize with the customer service data center of the customer service group coming on shift or about to begin the next temporal work shift. The threshold can be dynamically determined, for example, based on a number of unsolved problems or an amount of unsolved problem data to be handed off and synchronized, can be estimated or adjusted based on historic volumes of unsolved or continuing problems and related data, and so forth. As noted earlier, unsolved problems to be handed off to a next customer service group can have different priority and can be prioritized with respect to each other. For example, data regarding a highest priority unsolved problem can be synchronized before a lower priority unsolved problem. This can occur in a single communication channel, where data regarding unsolved problems is synchronized or transferred to a data center of a next-shift customer service group before data regarding solved problems, and where data for a high priority, unsolved problem is synchronized or transferred before data regarding a lower priority, unsolved problem. Additionally or alternatively, different communication channels can be used, with data regarding unsolved problems being synchronized and transferred via a first communication channel such as the communication link 142 that is one or more of faster, more secure, more reliable, or of greater bandwidth, and so forth, than a second communication channel such as the communication link 143. Data regarding solved problems can be synchronized and transferred via the second communication channel that is slower, less expensive and/or more available than the first communication channel. These concepts can also be combined, for example using the first communication channel for data regarding unsolved problems that have a degree of importance above a predetermined threshold, and using the second communication channel for data regarding unsolved problems that have a lesser degree of importance or urgency (with, for example, data in the second communication channel being prioritized to synchronize and transfer data regarding unsolved problems before data regarding solved problems). Capacity of the first channel can also form a functional threshold, so that the first communication channel is filled-to-capacity with data for highest-ranked unsolved problems, and data regarding unsolved problems having lower rank is routed through the second communication channel Unsolved problems can be prioritized based on multiple factors, including, for example, a number of customers affected, an amount of service consumption or data flow that is affected, a class of customer that is affected, and/or costs resulting from the unsolved problem (monetary cost or contractual damages, customer good will, company reputation, etc.).

As noted earlier, a problem that has been solved but is determined as likely to recur (for example by a customer service data center's computational resource, such as the computational resource 111 of the Mumbai customer service data center) can be classified as higher priority than other solved problems, and can be classified as having priority that is equal to one or more priorities of unsolved problems. Thus, information regarding a solved but likely recurring problem can be classified to be synchronized and transferred via the first communication path, and/or can be synchronized and transferred before data regarding other solved problems, for example in the first communication path or in the second communication path. The prioritization or re-prioritization of a problem, solved and/or unsolved, may be performed dynamically by computational resources within the customer service data center, for example, by the computational resources 111, 121, 131 shown in FIG. 1.

In general, after prioritizing or re-prioritizing problems and determining which to hand off with a higher priority from a current customer service group to a next customer service group coming on shift, synchronization can take place in due course between the data center serving the current customer service group and a different data center serving the next customer service group that is coming on shift (and/or other data centers), in accordance with synchronization and data transmission priorities established for the different sets of data associated with the different problems and tasks handled by the customer service team that encompasses the different customer service groups. Costs and availability of different communication and data synchronization paths and options can be considered together with importance and priority of problems and problem-related data to be transferred/synchronized, in determining which data synchronization/transmission paths and techniques to use for communicating and synchronizing the problem-related data sets corresponding to different problems among different data centers that variously support the different customer service groups within the customer service team.

In this way computing resources that support the data centers and synchronization of data between them can be conserved and effectively managed, and costs can be reduced, effectively controlled and/or resources reserved or preserved to support resolution of higher priority problems or objectives within the telecommunication service provider network, for example within a wireless carrier network of the telecommunication service provider, that includes or is supported by customer service teams and groups within the teams and the data centers variously associated with them.

Example service problems can include service outages due to local disruptions such as fire, flood or earthquake, connectivity issues for services that support clients that rely on networks (e.g., vending machines linked in a communications network supported or provided by a wireless carrier network, security apparatus or systems of corporate or government entities that rely on communication services provided by the wireless carrier network, and so forth).

Figure 2:
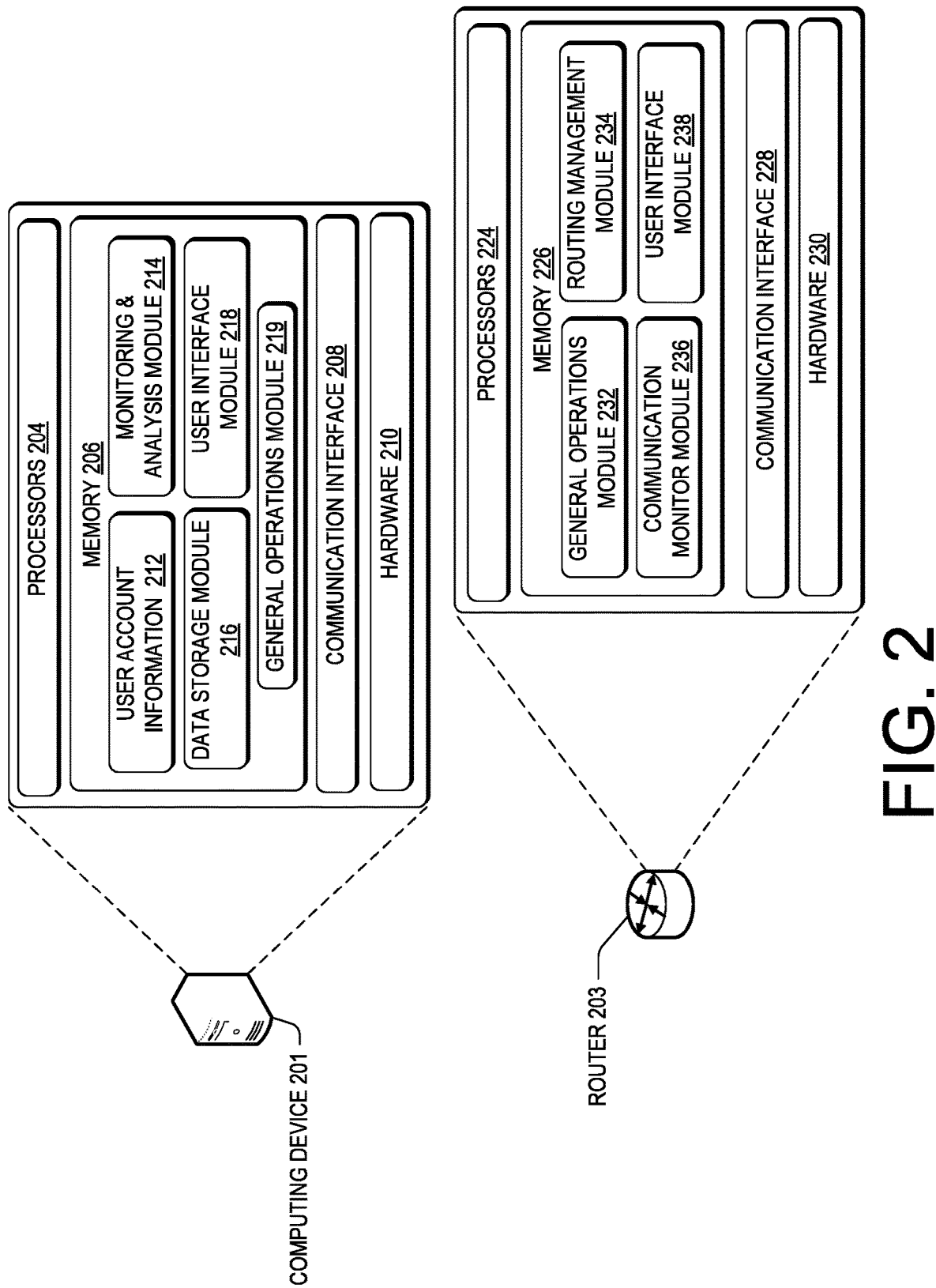
FIG. 2 shows illustrative details for various computational resources and user equipment to implement different aspects of the architecture shown in FIG. 1.

FIG. 2 shows illustrative details of a computing device 201 and a router 203 that can support, or be variously implemented as, the system components and functions shown in FIG. 1 and/or functions described herein with respect to various embodiments and scenarios.

One or more instances of the computing device 201 can, for example, form a basis for the user equipment 114, 116, 124, 126, 134, 136 as well as for other equipment and functions of the telecommunication service provider customer service data centers Mumbai 110, New York 120, and Auckland 130, and computing environment 100, including, for example, the computational resources 111, 121, 131 which can be implemented as servers. One or more instances of the computing device 201 can also form or support the data stores 112, 122, 132. One or more instances of the computing device 201 can also support or provide the various functions described with respect to the process of FIG. 3. The computing device 201 includes processors 204, hardware 210, and a communication interface 208. The computing device 201 also has a memory 206 that includes (but is not limited to) the various software modules shown. The user account information module 212 can contain information about one or more user accounts with a telecommunication service provider as well as for user accounts with third party entities, from either a client perspective (e.g., information on a user equipment owned or controlled by the user) or from a server/service provider perspective (e.g., information about the user and their account that is resident on, or accessible to, a telecommunication service provider with whom the user has a service subscription or a third party entity providing services to the user). The monitoring and analysis module 214 can support communication monitoring and analysis functions of the computational resources 111, 121, 131 and routers 113, 123, 133, as well as monitoring and analysis functions in the user equipment 114, 116, 124, 126, 134, 136 that can implement and adjust communication functions in cooperation with the communication interface 208. The general operations module 219 can support different functions of various applications running on the computing device 201 including tasks delegated from other devices or services. The user interface module 218 can provide user interface functions and capability for the user equipment 114, 116, 124, 126, 134, 136 as well as for the computational resources 111, 121, 131 to enable users and administrators or technicians to access and operate the user equipment and computational resources or servers. The data storage module 216 can, for example, support data store functions and operations so that one or more instances of the computing device 201 can be implemented as one or more of the data stores 112, 122, 132.

One or more instances of the router 203 can be variously located within and support routing functions within the New York City 120, Mumbai 110, and Auckland 130 customer service data centers, and can for example be implemented as the routers 113, 123, 133. The router 203 includes processors 224, a communication interface 228, hardware 230, and a memory 226 that contains various software modules including a routing management module 234 that supports various routing functions of the router 203. A communication monitor module 236 can support monitoring of communications between the router 203 and other entities, for example message traffic between customer service data centers, to support analysis and management functions performed by the computational resources 111, 121, 131 or other elements within the computing environment 100. Also included are a user interface module 238 to facilitate direct communications with a human operator if needed, and a general operations module 232 that can enable the router 203 to accept and accomplish various tasks for the system or subsystem to which it more particularly belongs.

The processor 204, 224 may be a central processing unit, an application processing unit, and/or a dedicated controller such as a microcontroller. The processor 204, 224 may be responsible for executing software instructions stored in the memory, which can be associated with common types of volatile (RAM) and/or non-volatile (ROM) memory.

The hardware 210, 230 may include signal converters, transceivers, antennae, hardware decoders and encoders, graphics processors, and/or the like that enables the computing device 201 and router 203, respectively, to execute applications.

In various examples, the communication interface 208, also known as a network interface(s) 304, may include any sort of transceiver known in the art. For example, the communication interface 208 may include a radio transceiver that performs the function of transmitting and receiving radio frequency communications via an antenna. In addition, the communication interface 208 may also include a wireless communication transceiver and a near-field antenna for communicating over unlicensed wireless Internet Protocol (IP) networks, such as local wireless data networks and personal area networks (e.g. Bluetooth or near field communication (NFC) networks). Further, the communication interface 208 may include wired communication components, such as an Ethernet port or a Universal Serial Bus (USB).

The memories 206, 226 optionally include computer-readable storage media. Computer-readable storage media can include or encompasses volatile and non-volatile, removable and non-removable media implemented in any method or technology for storage of information such as computer-readable instructions, data structures, program modules, or other data. Computer-readable storage media includes, but is not limited to, random access memory (RAM), read only memory (ROM), electrically erasable programmable read only memory (EEPROM), flash memory or other memory technology, compact disk-read only memory (CD-ROM), digital versatile disks (DVD), high-definition multimedia/data storage disks, or other optical storage, magnetic cassettes, magnetic tape, magnetic disk storage or other magnetic storage devices, or any other medium that can be used to store information for access by a computing device. As defined herein, computer-readable storage media do not consist of, and are not formed exclusively by, modulated data signals, such as a carrier wave.

Figure 3:
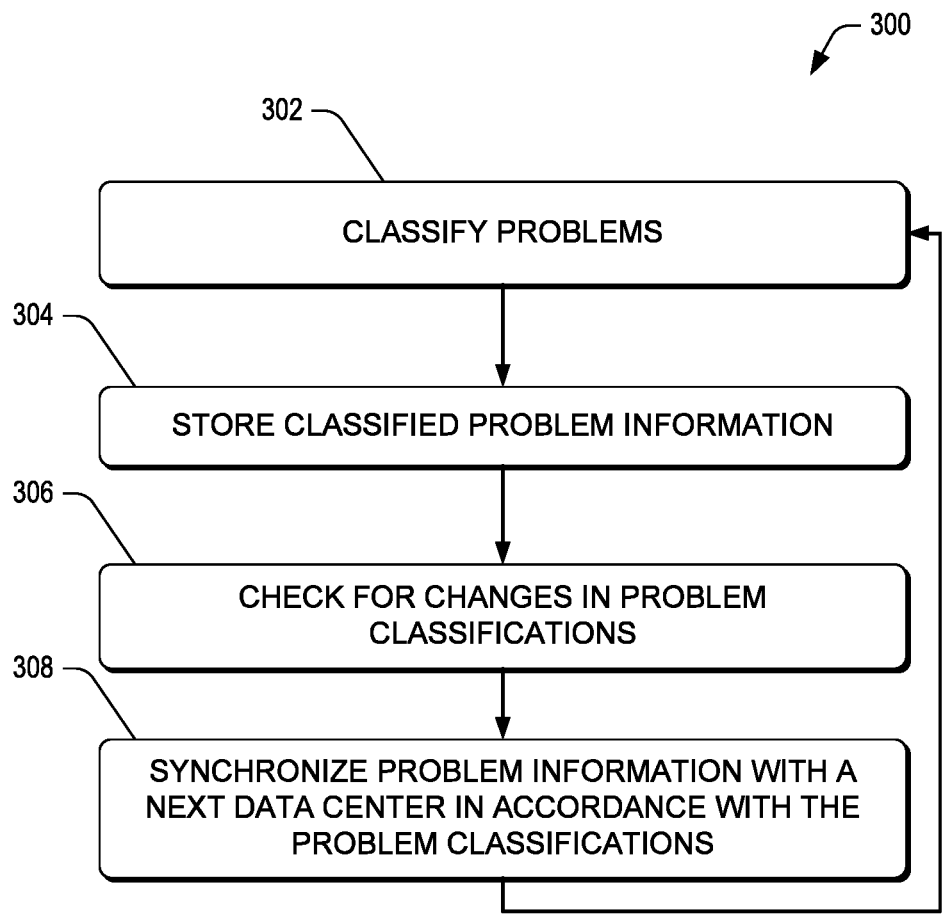
FIG. 3 is a flow diagram of an illustrative process for implementing techniques for synchronizing prioritized data between different customer service data centers.

FIG. 3 illustrates a process that encompasses embodiments and scenarios variously described herein. In a first block 302, problems are classified. At a basic level the classification is into two categories, solved, and unsolved. As earlier described, unsolved problems are classified as having higher priority for synchronization from a customer service data center supporting a customer service group having a current temporal work shift, to a customer service data center supporting a next customer service group having a next temporal work shift that will commence and/or end (since in some embodiments the shifts can overlap) after the current temporal work shift. Solved problems will generally be classified as having lower priority than unsolved problems, except that solved problems that are likely or anticipated to recur can be classified similarly to unsolved problems and be synchronized with higher priority than other solved problems. In example embodiments, classification can be further refined by determining, during the classification, that an unsolved problem is unlikely to be solved within the current temporal work shift, and therefore can be promptly transferred or handed off to a customer service group having a next temporal work shift, for resolution and/or monitoring. The classification in block 302 can also include relative classification of unsolved problems (and/or problems solved but likely to recur) so that unsolved problems can be rank-ordered for synchronization. In this situation, higher-ranked or highest-ranked unsolved problems are prioritized to have their information synchronized before lower-ranked unsolved problems and/or solved but likely recurrent problems, and/or to have their information synchronization take place on a different communication channel than lower-priority problems. In example embodiments, synchronization of unsolved problems that are determined as unlikely to be solved before an ending of the current temporal work shift, or which are unlikely to be solved before an amount of time remaining in the current temporal work shift crosses a predetermined minimum threshold, can commence in response to the determination.

From block 302 the process moves to block 304, where information regarding the classified problems is stored or updated. From block 304 the process moves to block 306, where a check is made for changes in classification, for example to check whether a problem initially classified as unsolved has been solved, or a solved problem has been recently determined to be likely to recur in a next temporal work shift. In example embodiments, the blocks 302, 304, 306 can be iteratively looped or cycled or repeated multiple times before proceeding from block 306 to block 308, or can be iteratively looped to include block 308 in each loop as shown in FIG. 3.

From block 306 the process moves to block 308, where problem information is synchronized and transferred from the current customer service data center to a next customer service data center supporting a customer service team responsible for the next temporal work shift, in accordance with the problem classifications. As described earlier, this can involve synchronizing higher priority (e.g., unsolved) problem data before lower (e.g., solved) problem data, synchronizing higher priority problem data on faster or otherwise more capable communication links than lower priority problem data, and so forth. As earlier described, synchronization can commence upon a determination that an unsolved problem is unlikely to be solved or will not be solved prior to an ending of the current temporal work shift or prior to a remaining time in the current temporal work shift passing below a predetermined threshold. Synchronization can additionally or alternatively commence after a remaining time in the current temporal work shift passes below a predetermined threshold, and the predetermined threshold can be determined in different ways, including based on a current workload of customer service representatives and a queue length of unsolved problems, based on historic or past information, or can be arbitrarily chosen.

From block 308, the process returns to block 302 and commences anew.

All or some of the operations and functions variously described herein with respect to example embodiments and scenarios and the process shown in FIG. 3 can be variously re-ordered, performed sequentially or in parallel, and performed iteratively. For example, blocks 302 and 308 can be performed simultaneously, and classification of problems (for example, newly arising problems) can occur at any time. In addition, any of the process details described herein can be variously included in one or more of the process steps shown in FIG. 3

Various embodiments provide technical advantages that enable greater service and functionality to be provided to users with greater efficiency and lower resource cost. For example, prioritized synchronization operations described herein enable resolution of important and/or urgent problems more quickly and use data synchronization/transfer processes and mechanisms efficiently. This results in technical benefits including increased system performance, lower energy costs and lower capital investment/equipment costs to provide desired levels of telecommunication services.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network device for synchronizing data stores associated with customer service teams that share responsibilities and have different temporal duty shifts, comprising:
   at least one processor;
   a network interface;
   a storage device coupled to at least one processor; and
   software instructions stored in the storage device, wherein execution of the software instructions by the at least one processor configures the network device to:
   determine that first information presented to a first customer service team in a first temporal duty shift is related to unsolved problems;
   determine that second information presented to the first customer service team in the first temporal duty shift is related to solved problems;
   based on determining that the first information is related to unsolved problems, classify the first information as having a first priority;
   based on determining that the second information is related to solved problems, classify the second information as having a second priority that is lower than the first priority;
   store, in a first data store associated with the first customer service team, (i) the first information and first classification data indicating that the first information is classified as having the first priority and (ii) the second information and second classification data indicating that the second information is classified as having the second priority that is lower than the first priority;
   determine that a current temporal duty shift is transitioning from the first temporal duty shift to a second temporal duty shift;
   based on determining that the current temporal duty shift is transitioning from the first temporal duty shift to the second temporal duty shift, determine to synchronize (i) the first information and the first classification data stored in the first data store with a second data store associated with a second customer service team designated to receive responsibility in the second temporal duty shift and (ii) the second information and the second classification data stored in the first data store with the second data store; and
   in response to determining to synchronize (i) the first information and the first classification data stored in the first data store with the second data store and (ii) the second information and the second classification data stored in the first data store with the second data store and based on (i) classifying the first information as having the first priority and (ii) classifying the second information as having a second priority that is lower than the first priority:
      synchronize the first information and the first classification data stored in the first data store with the second data store using a first communication channel that consumes a first amount of computing resources; and
      after synchronizing the first information and the first classification data stored in the first data store with the second data store, synchronize the second information and the second classification data stored in the first data store with the second data store using a second communication channel that consumes a second amount of computing resources that is less than the first amount of computing resources.

2. The network device of claim 1, wherein the first and second data stores are geographically dispersed across different world time zones.

3. The network device of claim 1, wherein execution of the software instructions by the at least one processor further configures the network device to determine that the current temporal duty shift is transitioning from the first temporal duty shift to the second temporal duty shift based on determining that a remaining amount of time in the first temporal duty shift crosses a first predetermined threshold.

4. The network device of claim 1, wherein execution of the software instructions by the at least one processor further configures the network device to:
   determine that a first unsolved problem is likely to remain unsolved before an end of the first temporal duty shift; and
   synchronize information related to the first unsolved problem and classification data of the first unsolved problem stored in the first data store with the second data store in response to determining that the first unsolved problem is likely to remain unsolved before the end of the first temporal duty shift.

5. The network device of claim 1, wherein execution of the software instructions by the at least one processor further configures the network device to rank the unsolved problems and synchronize the first information and the first classification data in an order reflecting the ranking.

6. The network device of claim 1, wherein the first communication channel has higher transmission rates than the second communication channel.

7. The network device of claim 6, wherein the first communication channel has stronger security than the second communication channel.

8. The network device of claim 1, wherein execution of the software instructions by the at least one processor further configures the network device to determine that a first solved problem is likely to recur during the second temporal duty shift and in response to the determination, classify information relating to the first solved problem as having the first priority.

9. A method for synchronizing data stores associated with customer service teams that share responsibilities and have different temporal duty shifts, comprising:
   determining that first information presented to a first customer service team in a first temporal duty shift is related to unsolved problems;
   determining that second information presented to the first customer service team in the first temporal duty shift is related to solved problems;
   based on determining that the first information is related to unsolved problems, classifying the first information as having a first priority;
   based on determining that the second information is related to solved problems, classifying the second information as having a second priority that is lower than the first priority;
   storing, in a first data store associated with the first customer service team, (i) the first information and first classification data indicating that the first information is classified as having the first priority and (ii) the second information and second classification data indicating that the second information is classified as having the second priority that is locate than the first priority;
   determining that a current temporal duty shift is transitioning from the first temporal duty shift to a second temporal duty shift;

based on determining that the current temporal duty shift is transitioning from the first temporal duty shift to the second temporal duty shift, determining to synchronize (i) the first information and the first classification data stored in the first data store with a second data store associated with a second customer service team designated to receive responsibility in the second temporal duty shift and (ii) the second information and the second classification data stored in the first data store with the second data store; and in response to determining to synchronize (i) the first information and the first classification data stored in the first data store with the second data store and (ii) the second information and the second classification data stored in the first data store with the second data store and based on (i) classifying the first information as having the first priority and (ii) classifying the second information as having a second priority:

synchronizing the first information and the first classification data stored in the first data store with the second data store using a first communication channel that consumes a first amount of computing resources; and after synchronizing the first information and the first classification data stored in the first data store with the second data store, synchronizing the second information and the second classification data stored in the first data store with the second data store using a second communication channel that consumes a second amount of computing resources that is less than the first amount of computing resources.

10. The method of claim 9, wherein the first and second data stores are geographically dispersed across different world time zones.

11. The method of claim 9, comprising determining that the current temporal duty shift is transitioning from the first temporal duty shift to the second temporal duty shift based on determining that a remaining amount of time in the first temporal duty shift crosses a first predetermined threshold.

12. The method of claim 9, comprising:
determining that a first unsolved problem is likely to remain unsolved before an end of the first temporal duty shift; and
in response to the determination, synchronizing information relating to the first unsolved problem and classification data of the first unsolved problem stored in the first data store with the second data store associated with the second customer service team.

13. The method of claim 9, comprising:
ranking the unsolved problems; and
synchronizing the first information and the first classification data in an order reflecting the ranking.

14. The method of claim 9,
wherein the first communication channel has higher transmission rates than the second communication channel.

15. The method of claim 9, comprising:
determining that a first solved problem is likely to recur during the second temporal duty shift; and
in response to the determination, classifying information relating to the first solved problem as having the first priority.

16. One or more computer-readable storage media storing instructions that, when executed by one or more processors, cause the processors to perform acts comprising:
determining that first information presented to a first customer service team in a first temporal duty shift is related to unsolved problems;

determining that second information presented to the first customer service team in the first temporal duty shift is related to solved problems;

based on determining that the first information is related to unsolved problems, classifying the first information as having a first priority;

based on determining that the second information is related to solved problems, classifying the second information as having a second priority that is lower than the first priority;

storing, in a first data store associated with the first customer service team, (i) the first information and first classification data indicating that the first information is classified as having the first priority and (ii) the second information and second classification data indicating that the second information is classified as having the second priority that is lower than the first priority;

determining that a current temporal duty shift is transitioning from the first temporal duty shift to a second temporal duty shift;

based on determining that the current temporal duty shift is transitioning from the first temporal duty shift to the second temporal duty shift, determine to synchronize (i) the first information and the first classification data stored in the first data store with a second data store associated with a second customer service team designated to receive responsibility in the second temporal duty shift and (ii) the second information and the second classification data stored in the first data store with the second data store; and in response to determining to synchronize (i) the first information and the first classification data stored in the first data store with the second data store and (ii) the second information and the second classification data stored in the first data store with the second data store and based on (i) classifying the first information as having the first priority and (ii) classifying the second information as having a second priority:

synchronizing the first information and the first classification data stored in the first data store with the second data store using a first communication channel that consumes a first amount of computing resources; and after synchronizing the first information and the first classification data stored in the first data store with the second data store, synchronizing the second information and the second classification data stored in the first data store with the second data store using a second communication channel that consumes a second amount of computing resources that is less than the first amount of computing resources;

wherein the first and second data stores are geographically dispersed across different world time zones.

17. The one or more computer-readable storage media of claim 16, the acts further comprising:
ranking the unsolved problems; and
synchronizing the first information and the first classification data stored in the first data store with the second data store in an order reflecting the ranking, after a remaining amount of time in the first temporal duty shift crosses a first predetermined threshold.

18. The one or more computer-readable storage media of claim 16, the acts further comprising:
determining that a first unsolved problem is likely to remain unsolved before an end of the first temporal duty shift; and in response to the determination, synchronizing information relating to the first unsolved problem and classification data of the first unsolved problem stored in the first data store with the second data store associated with the second customer service team.

19. The one or more computer-readable storage media of claim 16,
wherein the first communication channel has higher transmission rates than the second communication channel.

20. The one or more computer-readable storage media of claim 16, the acts further comprising:
determining that a first solved problem is likely to recur during the second temporal duty shift; and
in response to the determination, classifying information relating to the first solved problem as having the first priority.

\* \* \* \* \*